United States Patent
Leachman

(10) Patent No.: US 6,948,692 B2
(45) Date of Patent: Sep. 27, 2005

(54) MOUNTING CLIP FOR REMOVABLE PROTECTIVE SHIELDS

(75) Inventor: Joseph Daniel Leachman, Rancho Santa Margarita, CA (US)

(73) Assignee: Mitsubishi Digital Electronics America, Inc., Irvine, CA (US)

( * ) Notice: Subject to any disclaimer, the term of this patent is extended or adjusted under 35 U.S.C. 154(b) by 0 days.

(21) Appl. No.: 10/664,221

(22) Filed: Sep. 16, 2003

(65) Prior Publication Data

US 2005/0056748 A1 Mar. 17, 2005

(51) Int. Cl.[7] .............................................. A47B 96/06
(52) U.S. Cl. ........................... 248/231.81; 248/316.7; 248/907
(58) Field of Search .................... 248/231.81, 316.7, 248/229.16, 229.26, 228.7, 918; 359/609; 348/818; 40/792, 793

(56) References Cited

U.S. PATENT DOCUMENTS

| | | | | |
|---|---|---|---|---|
| 3,163,385 A | * | 12/1964 | Lazan, Jr. | 248/37.6 |
| 4,556,183 A | * | 12/1985 | Greenberger | 248/222.12 |
| 5,955,170 A | * | 9/1999 | Davis et al. | 428/81 |
| 6,378,828 B1 | * | 4/2002 | Valiulis et al. | 248/231.81 |
| RE37,688 E | * | 5/2002 | Vilims | 40/792 |
| 6,601,809 B1 | * | 8/2003 | Gebrara | 248/229.16 |
| 6,637,716 B2 | * | 10/2003 | Wear | 248/489 |
| 2004/0004169 A1 | * | 1/2004 | Hays | 248/229.16 |

* cited by examiner

Primary Examiner—Ramon O. Ramirez
(74) Attorney, Agent, or Firm—Orrick, Herrington & Sutcliffe LLP

(57) ABSTRACT

The present invention is directed to a mounting clip that facilitates easy installation and removal of protective shields for PTVs and other video display units. The clip preferably comprises a base attached to the protective shield and a thin walled body extending from the base. An forward lobe of the body includes a generally semi-circular nose and a locking member protruding from the body adjacent the base of the nose. A rear lobe of the body is preferably non-contiguous at a base end on the same side of the body from which the locking member protrudes to form a spring-like lever arm. The base end of the lever arm is preferably bent inwardly to form a push or handle member. In operation, the clip snaps into predetermined grooves positioned about the periphery of the display unit screen. Once inserted into the groove, the locking member abuts a stepped surface formed in the wall of the groove to removably lock the clip in place. To release the locking member and remove the clip from the groove, the handle member is depressed directing the lever arm and the locking member inwardly a distance sufficient to bypass the stepped surface in the channel. The shield and clip are then pulled outwardly to remove the clip from the groove.

15 Claims, 1 Drawing Sheet

MOUNTING CLIP FOR REMOVABLE PROTECTIVE SHIELDS

FIELD OF THE INVENTION

The invention relates generally to projection television systems and more particularly to mounting clips for removable protective shields.

BACKGROUND INFORMATION

Projection and other large screen televisions (PTVs), including monochrome cathode ray tube (CRT), liquid crystal on silicon (LCOS), digital light processing (DLP) and liquid crystal display (LCD) technology based PTVs, are a popular alternative to shadow mask CRT television sets, as they provide relatively large viewable screens that cannot be efficiently produced using conventional shadow mask CRTs. PTVs typically include an enclosure housing an optical unit and electronic components for receiving and projecting an image onto a screen assembly mounted on the front of the enclosure. In CRT based PTVs, the optical unit typically includes a mirror and three projection tubes having a CRT optically coupled to a projection lens. The three projection tubes project a red, a green, and a blue image on to a screen of the PTV.

The screen of the PTV is typically a high-quality optical system that is carefully designed to deliver sharp, bright images with even illumination. PTV manufacturers often affix protective shields or screens formed from a hard clear or tinted plastic, acrylic or the like to the PTV to protect the projection screen from physical damage. Due to the generally large size of the shields and the mechanical means by which the shields are typically attached to the PTV, installing such shields in the factory and/or removing and re-installing the shields in the field at a customer's home tends to be quite difficult and cumbersome.

Accordingly, it would be desirable to provide a means that facilitates easy installation and removal of a protective shield.

SUMMARY

The present invention is directed to a mounting clip that facilitates easy installation and removal of protective shields for PTVs and other video display units. The clip preferably comprises a base that is preferably attached to the back or display unit side of the protective shield or other screen, adjacent its edge, with an adhesive, double sided tape or the like. The body of the clip, which extends up or out from the base, is relatively thin walled and configured in a generally kidney bean shape. The base and body of the clip are preferably formed from PVC or other durable yet resilient material. An upper or forward lobe of the body includes a generally semi-circular or rounded nose or forward end and a locking member, such as a stop or protuberance extending orthogonally from the body adjacent the base of the nose or intermediate region of the body. A lower or rear lobe of the body is preferably non-contiguous at a base end on the same side of the body from which the locking member protrudes to form a spring-like lever arm or cantilever member out of a portion of the body. The base end of the lever arm is preferably bent inwardly to form a push or handle member.

In operation, the clip snaps into predetermined grooves or channels positioned about the periphery of the display unit's screen. Once inserted into the groove or channel, the locking member abuts a stepped surface formed in the wall of the groove to removably lock the clip in place. To release the locking member and remove the clip from the groove, the handle member is depressed compressing the body by directing the lever arm and, thus, the locking member inwardly toward the opposite wall of the body a distance sufficient to enable the locking member to bypass the stepped surface in the channel. The shield and clip are then pulled outwardly to remove the clip from the groove.

Other features and advantages of the invention will be or will become apparent to one with skill in the art upon examination of the following figures and detailed description.

BRIEF DESCRIPTION OF THE FIGURES

The details of the invention, including fabrication, structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

DETAILED DESCRIPTION

The mounting clip described herein provides for easy installation and removal of a screen such as a protective screen or shield for a PTV or other display unit. The clip easily snaps in and out of a predetermined groove to install the shield on and remove it from the display unit. The body of the clip is compressible to allow it to be inserted into the groove where it springs back to its original shape to lock the clip in place within the groove. Because the clip is mountable on the back or display unit side of the protective shield, all mechanical hardware is advantageously concealed allowing for a "flat screen" appearance.

Figure 1:
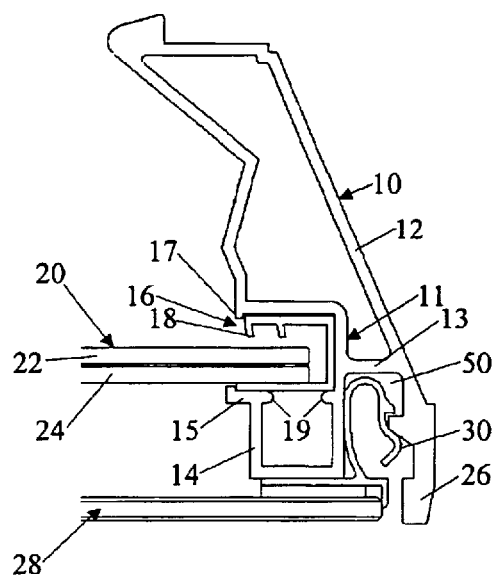
FIG. 1 depicts a partial plan view of an assembly comprising a screen frame, a screen assembly, a removable protective shield and a mounting clip in accordance with the present invention.
Figure 2:
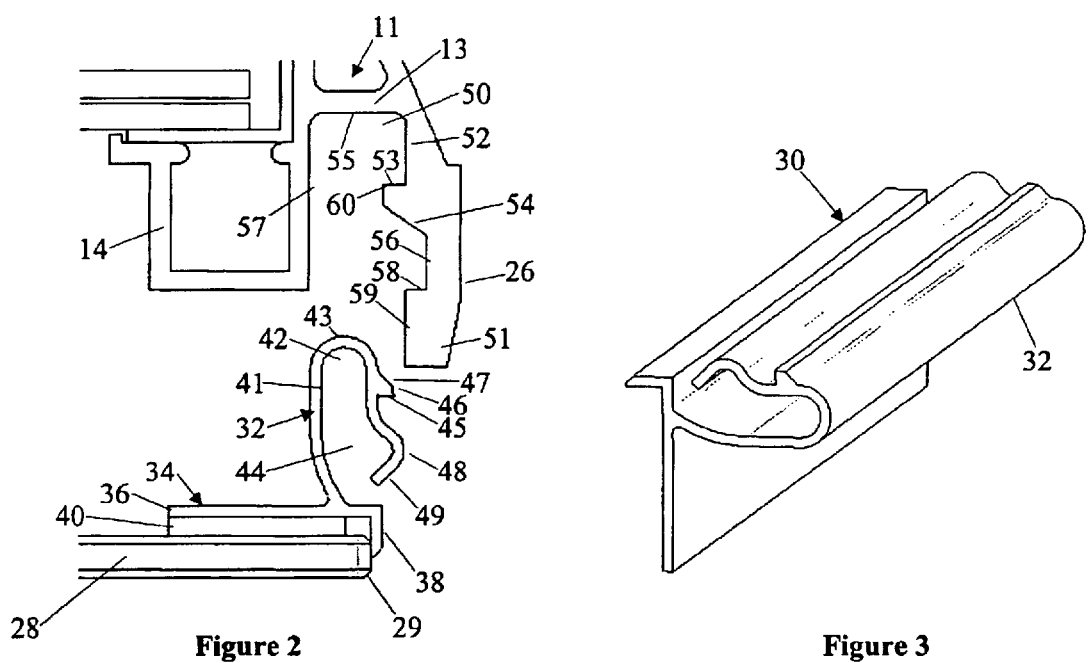
FIG. 2 depicts a partial plan view of an exploded assembly comprising a screen frame, a removable protective shield and a mounting clip.

Referring in detail to the figures, a display screen and protective shield assembly including the mounting clip of the present invention is shown (in partial plan view) in FIGS. 1 and 2. More particularly, the display screen and protective shield assembly comprises a screen frame 10, a screen assembly 20 coupled to the screen frame 10, a protective shield 28, a mounting clip 30 in accordance with the present invention coupled to the shield 28 on its display screen 20 side and releasably coupled to the screen frame 10 or some other component of the PTV or display unit such as the display unit cabinet, enclosure, or the like with a groove 50 formed therein. The screen frame 10 includes a main body 12 having a desired shape to accommodate mounting in or on a PTV's cabinet, enclosure or the like (not shown). Extending from a screen end 11 of the main body 12 of the screen frame 10 and adjacent to a cross member 13 is a shield retaining arm 26 and a generally U-shaped screen retaining arm 14. At the top of each leg of the screen retaining arm 14 are inwardly directed protuberances 19 and at the top of the left leg is an L-shaped foot 15 that extends outwardly from the leg coextensively with the inwardly directed protuberance 19. A generally square channel or groove 16 is formed between the screen retaining arm 14 and the main body 12 of the screen frame 10. The channel is sized to receive, retain and compress an elongate box-like screen clamp 18. Once inserted in the channel 16, the clamp 18 firmly grasps the lenses, preferably a lenticular lens 24 and a Fresnel lens 22, of the screen assembly 20. The clamp 18 is retained vertically (in regard to the plane of the paper) by the screen retaining protuberances 19 and the main body 12 of the screen frame 10, and laterally by the foot 15 and a protuberance 17 extending from an internal side of the main body 12 of the screen frame 10.

An elongate mounting groove or channel 50 defined by side and end walls 57, 59 and 55 is preferably formed between the screen retaining arm 14 and the shield retaining arm 26 about the periphery of the screen 20 as a unitary groove or a multiple grooves. The channel 50 preferably includes an abutment 53 such as a protrusion directed inwardly toward the interior of the channel 50 from the side wall 59 of the shield retaining arm 26. The abutment 53 includes a flat or stepped surface front face 60 facing the end wall 55 of the groove 50 and a sloping back face 54 facing a direction opposite the back wall 55. The stepped surface 60 and back and side walls 55 and 59 of the channel preferably form a locking recess 52 within the groove 50. A second or intermediate recess 56, which includes a stepped surface 58, is formed in the wall 59 of the retaining arm 26 toward its front or nose end 51.

Figure 3:
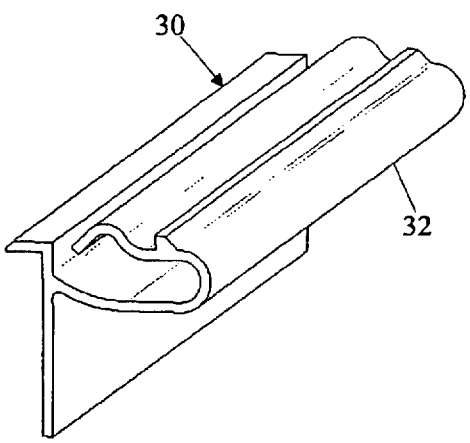
FIG. 3 depicts a perspective view of a mounting clip in accordance with the present invention.

The mounting clip 30 preferably includes an elongate body 32 (see FIG. 3) generally extending orthogonally to and outwardly or upwardly from an elongate L-shaped base 34. The base 34 and body 32 are preferably injection or extrusion molded as a unitary part from PVC, other plastics or the like that are durable yet resilient such that the body 32 of the clip 30 exhibits a shape memory or spring-like quality when compressed and released. The base 34 is preferably affixed to the backside of the protective shield 28 using an adhesive or double sided tape or the like 40, with the longer leg 36 extending inwardly from the edge 29 of the shield 28 and the shorter leg 38 abutting the edge 29 of the shield 28. In practice, preferably at least four (4) clips 30 would attach to the shield 28 along its four (4) edges.

The body 32 preferably comprises a relatively thin wall 41 forming a non-contiguous generally kidney bean shape having an upper or forward lobe 42 and lower or rear lobe 44. The upper lobe 42 preferably includes a generally rounded or semi-circular nose or forward end 43 and a locking member 46 comprising a protuberance or stop generally extending orthogonally and outwardly from the body 32 of the clip 30 adjacent the base of the nose 43 and/or mid-section of the body 32. The locking member 46 preferably includes a step or flat face 45 facing the base 34 and a sloping face 47 facing a direction opposite the base 34. The lower lobe 44 of the body 32 preferably includes a non-contiguous portion at its base end and on the same side of the body 32 from which the locking member 46 protrudes. Because the body 32 has a spring-like or shape memory quality due to its wall 41 thickness and the material from which it is formed, a portion, substantially half, of the body 32 forms a spring-like lever arm or cantilever member 48. The base end of the lever arm 48 is preferably bent inwardly to form a push or handle member 49.

In operation, the clip 30 snaps into the mounting groove or grooves 50 positioned about the periphery of the display screen 20. Once inserted into the groove 50, the step face 45 of the locking member 46 of the clip 30 abuts the stepped surface 60 of the protrusion 53 in the locking recess 52 of the groove 50 to removably or temporarily lock the clip 30 in place. During insertion, the sloped face 47 of the locking member 46 abuts the sloped face 54 of the groove protrusion 53 and slides over the protrusion 53 as the lever arm 48 flexes and the body 32 compresses inwardly until the locking member 46 travels a distance sufficient to pass the protrusion 53 at which time the lever arm 48 springs back to its original, non-compressed shape to lock the clip 30 in place. When inserted, the nose 43 and the contiguous side of the body 32 of the clip 30 abut the side and end walls 57 and 55 of the groove 50 thereby removably fixing their position within the groove 50.

To release the lock 46 and remove the clip 30 from the groove 50, the handle member 49 is depressed directing the lever arm 48 and, thus, the lock 46 inwardly toward the opposite or contiguous wall of the body 32, essentially compressing the body 32 an amount sufficient to enable the lock 46 to bypass the stepped surface 60 of the abutment 53. The shield 28 and clip 30 are then pulled outwardly to remove the clip 30 from the groove 50. Alternatively, the shield 28 may be held in an intermediate mounted position by inserting the clip 30 a sufficient distance to allow the lock 46 to abut the stepped surface 58 of the intermediate recess 52.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, unless otherwise stated, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A protective shield for a display unit screen comprising a shield body, and
a mounting clip coupled to the shield body adjacent an edge of the shield body, the clip comprising a clip body that is compressible and returnable to an uncompressed state and includes forward and rearward lobes, wherein the forward lobe comprises a rounded nose, and a locking member extending outwardly from the clip body, wherein the locking member extends from the clip body adjacent to a base of the nose, and wherein the clip body comprises a thin non-contiguous wall forming a lever arm from a portion of the clip body from which the locking member extends.

2. The shield of claim 1 wherein the lever arm includes a handle.

3. The shield of claim 1 wherein the locking member comprises a stepped face and a sloping face.

4. The shield of claim 1 wherein the clip body comprises a kidney bean shape.

5. A protective shield for a display unit screen comprising a shield body, and
a mounting clip coupled to the shield body adjacent an edge of the shield body, the clip comprising a clip body that is compressible and returnable to an uncompressed state and includes forward and rearward lobes, wherein the forward lobe comprises a rounded nose, and a locking member extending outwardly from the clip body, wherein the locking member extends from the clip body adjacent to a base of the nose, and wherein the clip further comprises a base coupled to the clip body and the body of the shield.

6. The shield of claim 5 wherein the clip body is releasably receivable in a predetermined groove formed about a periphery of a screen of a display unit.

7. The shield of claim 5 wherein the base is L-shaped.

8. The shield of claim 7 wherein a short leg of the L-shaped base abuts an edge of the body and a long leg of the L-shaped base extends inwardly from the edge of the body.

9. A mounting clip for display unit screens comprising a compressible body that is returnable to an uncompressed state, wherein the body comprises thin wall and forward and rearward lobes, wherein the forward lobe comprises a rounded nose, and a locking member extending outwardly from the body, wherein the locking member extends from the body adjacent to a base of the nose, and wherein the wall is non-continuous forming a lever arm from a portion of the clip body from which the locking member extends.

10. The clip of claim 9 wherein the lever arm includes a handle.

11. The clip of claim 9 wherein the locking member comprises a stepped face and a sloping face.

12. The clip of claim 9 wherein the body comprises a kidney bean shape.

13. A mounting clip for display unit screens comprising a base, wherein the base is L-shaped, a compressible body that is returnable to an uncompressed state, wherein the body extends from the base and comprises a thin wall and forward and rearward lobes, wherein the forward lobe comprises a rounded nose, and a locking member extending outwardly from the body, wherein the locking member extends from the body adjacent to a base of the nose.

14. The clip of claim 13 wherein the body is releasably receivable in a predetermined groove formed about a periphery of a display screen of a display unit.

15. The clip of claim 13 wherein a short leg of the L-shaped base abuts an edge of a screen and a long leg of the L-shaped base extends inwardly from the edge of the screen.

* * * * *